(12) United States Patent
Westcott et al.

(10) Patent No.: US 10,661,722 B2
(45) Date of Patent: May 26, 2020

(54) HITCH COUPLING ASSEMBLY FOR COUPLING AN ACCESSORY TO A VEHICLE

(71) Applicant: Westcott Designs Inc., Cave Creek, AZ (US)

(72) Inventors: Jeffrey Richard Westcott, Cave Creek, AZ (US); Jody Daniel Davis, Chandler, AZ (US)

(73) Assignee: Westcott Designs Inc., Cave Creek, AZ (US)

( * ) Notice: Subject to any disclaimer, the term of this patent is extended or adjusted under 35 U.S.C. 154(b) by 0 days.

(21) Appl. No.: 16/365,432

(22) Filed: Mar. 26, 2019

(65) Prior Publication Data

US 2020/0047679 A1 Feb. 13, 2020

Related U.S. Application Data

(60) Provisional application No. 62/715,657, filed on Aug. 7, 2018.

(51) Int. Cl.
*B60R 9/06* (2006.01)
*A47J 37/07* (2006.01)
(Continued)

(52) U.S. Cl.
CPC ............. *B60R 9/06* (2013.01); *A47J 37/0704* (2013.01); *A47J 37/0786* (2013.01); *B60N 3/008* (2013.01); *B62D 43/02* (2013.01)

(58) Field of Classification Search
CPC .. B60R 9/06; B60R 9/065; B60R 9/10; B60D 1/52; B60D 1/06; B60D 1/241
See application file for complete search history.

(56) References Cited

U.S. PATENT DOCUMENTS

| 3,194,467 A | * | 7/1965 | Goonan | .................... H01P 1/04 228/50 |
| 4,282,994 A | | 8/1981 | Hilliard | |

(Continued)

FOREIGN PATENT DOCUMENTS

| CN | 206406843 U | 8/2017 |
| DE | 202016105755 U1 | 2/2018 |
| EP | 1008491 B1 | 11/1999 |

OTHER PUBLICATIONS

Aluminess Products, Inc., Ford Econoline Van Rear Bumper for 2008-2014, https://www.aluminess.com/ford/ford-vans-2008-2013/rear-bumper/, Jan. 9, 2019, Aluminess Products, Inc., United States.

*Primary Examiner* — Corey N Skurdal
(74) *Attorney, Agent, or Firm* — Schmeiser, Olsen & Watts LLP (57) ABSTRACT

A hitch coupling assembly that is used to couple an accessory to a vehicle is described. The hitch coupling assembly includes a receiver tube and a receiver wedge assembly. The receiver tube and the receiver wedge assembly are coupled to each other using a tightening bolt. The receiver tube, receiver wedge assembly, and tightening bolt are then inserted into a hitch receiver of a vehicle, and the tightening bolt is tightened to couple the hitch coupling assembly to the hitch receiver. A receiver lock can be used to lock the hitch coupling assembly into the hitch receiver. An accessory rack or other accessory that is coupled to the hitch coupling assembly is coupled to the hitch receiver and the vehicle by coupling the hitch coupling assembly to the hitch receiver.

20 Claims, 10 Drawing Sheets

(51) Int. Cl.
*B62D 43/02* (2006.01)
*B60N 3/00* (2006.01)

(56) References Cited

U.S. PATENT DOCUMENTS

| | | |
|---|---|---|
| 5,094,373 A | 3/1992 | Lovci |
| 5,244,133 A | 9/1993 | Abbott et al. |
| 5,333,888 A | 8/1994 | Ball |
| 5,423,566 A | 6/1995 | Warrington et al. |
| 5,518,159 A | 5/1996 | DeGuevara |
| 5,538,168 A | 7/1996 | Burger |
| 5,685,686 A | 11/1997 | Burns |
| 5,842,615 A | 12/1998 | Goodness |
| 5,884,826 A | 3/1999 | Shaver |
| 6,105,989 A | 8/2000 | Linger |
| 6,164,508 A | 12/2000 | van Veenen |
| 6,701,913 B1 | 3/2004 | LeDuc et al. |
| 6,835,021 B1 | 12/2004 | McMillan |
| 7,448,640 B2 * | 11/2008 | Weaver .................... B60D 1/06 280/506 |
| 7,810,439 B2 * | 10/2010 | Bless ........................ B60R 9/06 108/115 |
| 7,823,904 B2 | 11/2010 | Coy |
| 8,262,121 B2 * | 9/2012 | Beck ........................ B60D 1/52 280/491.2 |
| 8,419,041 B2 * | 4/2013 | Bessette ................... B60D 1/06 280/506 |
| 8,944,516 B2 * | 2/2015 | Eidsmore ................. B60P 1/28 280/506 |
| 9,421,836 B1 | 8/2016 | Ford et al. |
| 9,586,450 B2 * | 3/2017 | Ford ........................ B60D 1/24 |
| 10,479,284 B1 * | 11/2019 | Salyer ...................... B60R 9/06 |
| 2002/0171226 A1 | 11/2002 | McCoy et al. |
| 2004/0150189 A1 | 8/2004 | Deanda |
| 2006/0151555 A1 | 7/2006 | Mills |
| 2011/0278336 A1 | 11/2011 | Landrum |
| 2012/0292357 A1 | 11/2012 | Tennyson |
| 2015/0115010 A1 | 4/2015 | Ziola |
| 2018/0265014 A1 | 9/2018 | Phillips |

\* cited by examiner

HITCH COUPLING ASSEMBLY FOR COUPLING AN ACCESSORY TO A VEHICLE

CROSS REFERENCE TO RELATED APPLICATION

This invention claims priority to U.S. provisional patent application Ser. No. 62/715,657, filed Aug. 7, 2018 to Applicant Jeffrey Richard Westcott, and entitled "Tire Rack Assembly", which is incorporated entirely herein by reference.

BACKGROUND OF THE INVENTION

Technical Field

This invention relates to accessory racks for vehicles, and specifically to a hitch coupling assembly that couples an accessory rack or other accessory to the hitch receiver of a vehicle.

State of the Art

It is often desirable to couple an accessory rack to a vehicle to carry accessories such as tires, spare fuel tanks, or other items on the exterior of the vehicle. A common location to mount a vehicle accessory rack is on the rear side of the vehicle. Accessory racks exist that are attached to the rear bumper of a vehicle, but the bumper-mounted racks can put more weight on the bumper than today's vehicle bumpers are designed to hold. It is desirable to mount a vehicle rear side accessory rack to the hitch receiver of a vehicle instead of to the bumper.

Accordingly, what is needed is an assembly that easily and securely couples a vehicle accessory rack to the hitch receiver of a vehicle.

DETAILED DESCRIPTION OF EMBODIMENTS OF THE INVENTION

As discussed above, embodiments of the present invention relate to a hitch coupling assembly that couples an accessory to the hitch receiver of a vehicle. The accessory can be an accessory rack, a trailer hitch ball, or other type of accessory. The hitch coupling assembly can couple many types of accessories to a vehicle by coupling the accessory to the hitch receiver of the vehicle.

Accessory racks of various types have been used on the exterior of vehicles to carry spare tires, skis, boats, spare fuel tanks, or other items. Accessory racks coupled to the exterior of the vehicle at the back of the vehicle are particularly popular, especially for coupling accessories to sport utility vehicles (SUVs) and trucks. Accessory racks are often coupled to the rear side of SUVs and trucks for carrying spare tires and other accessories.

An accessory rack coupled to the vehicle bumper at the rear side of a truck or SUV can put more weight on the bumper than the bumper is designed to handle. Vehicle bumpers are often made of plastic and are not made to carry much weight. The disclosed hitch coupling assembly couples an accessory such as an accessory rack to the hitch receiver of a vehicle. The hitch coupling assembly includes a receiver tube and a receiver wedge element coupled to the receiver tube. An accessory rack or other type of accessory is coupled to the receiver tube. A tightening bolt couples the receiver tube and the receiver wedge element together. The receiver tube and the receiver wedge element are inserted into the hitch receiver of the vehicle. A nut on the tightening bolt is tightened to fixedly couple the receiver tube, the receiver wedge, and the accessory rack, or whatever accessory is coupled to the receiver tube, to the hitch receiver of the vehicle. A receiver lock pin is inserted through the hitch receiver and the receiver tube to block access to the nut so the hitch coupling assembly cannot be tampered with. A roll pin locks a bolt head of the tightening bolt into a cavity of the receiver wedge element to prevent removal of or tampering with the tightening bolt. In some embodiments, an accessory trailer hitch receiver is coupled to the receiver tube so that a trailer can still be pulled by the vehicle. In some embodiments, a trailer hitch ball is coupled to the receiver tube. The hitch coupling assembly securely couples the accessory rack or other accessory to the hitch receiver of the vehicle and limits side-to-side and up and down motion of the hitch coupling assembly in the hitch receiver.

Figure 1:
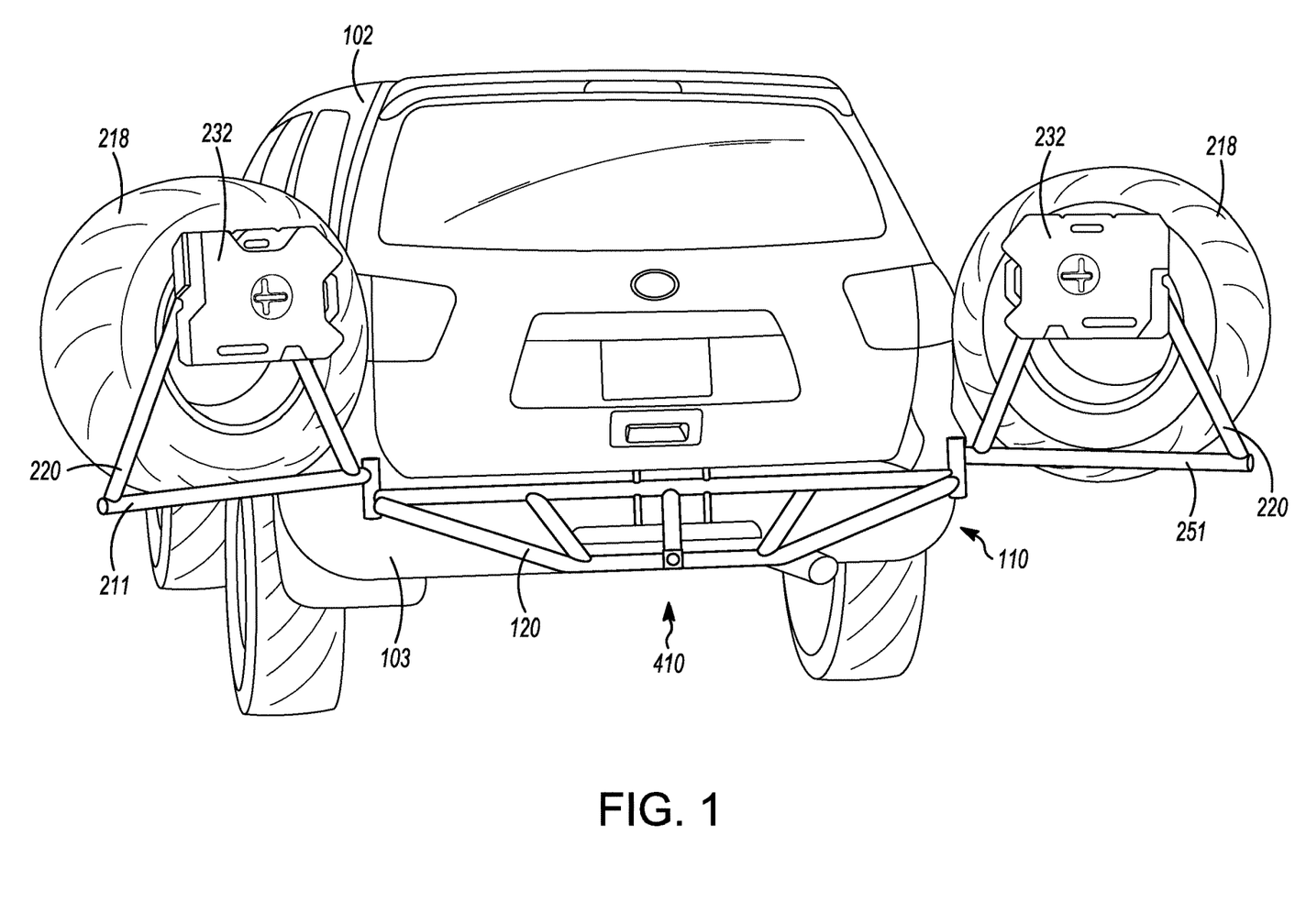
FIG. 1 shows a rear perspective view of a vehicle with an accessory rack coupled to the hitch receiver of the vehicle using a hitch coupling assembly.
Figure 2:
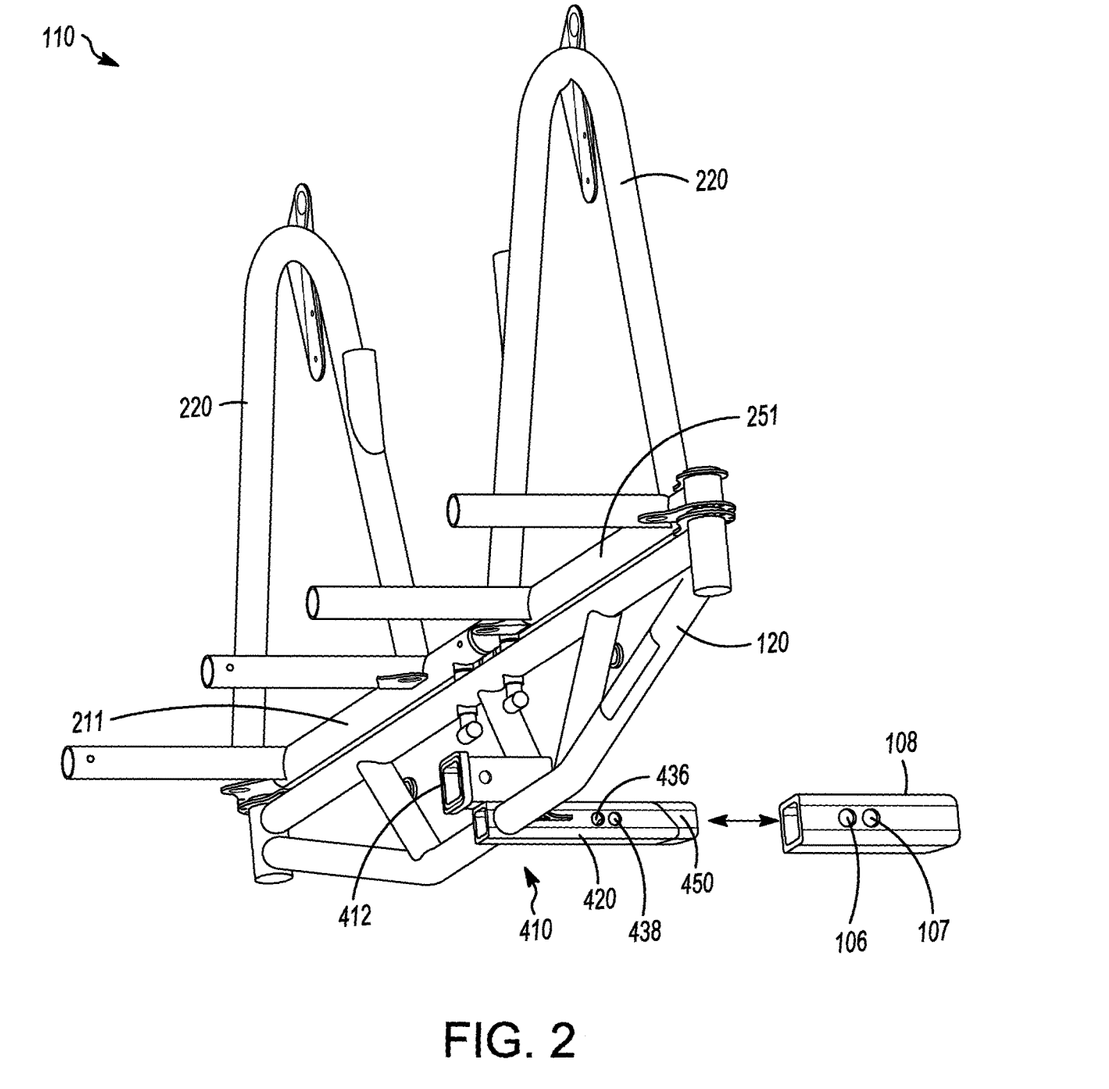
FIG. 2 shows an embodiment of an accessory rack coupled to a hitch coupling assembly, with the hitch coupling assembly being inserted into a hitch receiver of a vehicle to couple the accessory rack to the vehicle.
Figure 3:
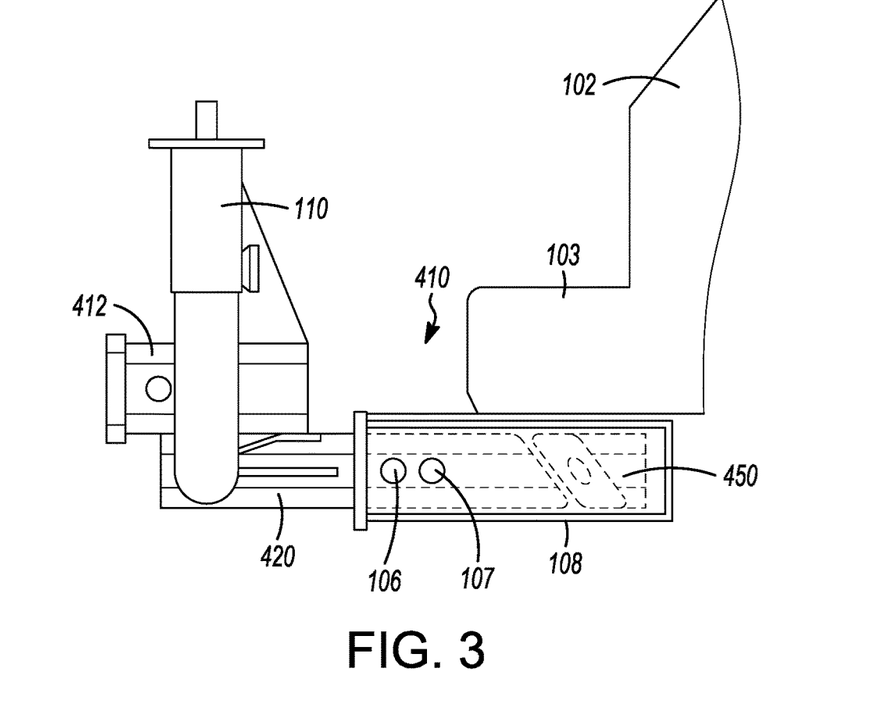
FIG. 3 shows a side view of a hitch coupling assembly coupling an accessory rack to the hitch receiver of a vehicle.
Figure 4:
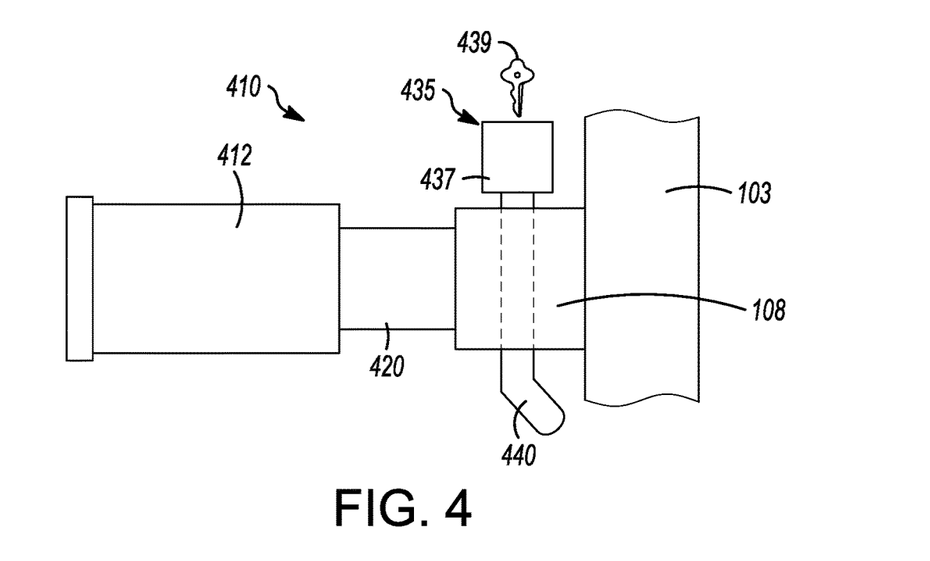
FIG. 4 shows a top view of a hitch coupling assembly coupling an accessory rack to the hitch receiver of a vehicle.

FIG. 1 through FIG. 4 shows an embodiment of a hitch coupling assembly 410 coupling an accessory rack 110 to a vehicle 102. FIG. 1 shows a rear view of vehicle 102 showing accessory rack 110 coupled to vehicle 102 with hitch coupling assembly 410. FIG. 2 shows a perspective view of hitch coupling assembly 410 coupling accessory rack 110 to a hitch receiver 108 of vehicle 102. FIG. 3 shows a side view of hitch coupling assembly 410 coupling accessory rack 110 to hitch receiver 108, and FIG. 4 shows a top view of hitch coupling assembly 110 coupling accessory rack 110 to hitch receiver 108.

Hitch coupling assembly 410 couples an accessory to vehicle 102 by coupling the accessory to hitch receiver 108 of vehicle 102, as shown in FIG. 1 through FIG. 4. Coupling the accessory to hitch receiver 108 of vehicle 102 reduces the stress on bumper 103 of vehicle 102 and provides a secure and reliable means to attach an accessory to vehicle

102. Hitch coupling assembly 410 can be used to attach an accessory such as accessory rack 110 to any vehicle that has a hitch receiver that hitch coupling assembly 410 will couple to.

In the embodiment shown in FIG. 1 through FIG. 4, hitch coupling assembly 410 is coupling accessory rack 110 to vehicle 102. Accessory rack 110 includes a base rack 120 that is coupled to hitch coupling assembly 410, and two tire racks 220 (FIG. 1 and FIG. 2). A first tire rack 220 is coupled to a first swing rod 211 that is hingedly coupled to base rack 120. A second tire rack 220 is coupled to a second swing rod 251 that is hingedly coupled to base rack 120. Each tire rack 220 can hold a tire 218 and a spare fuel tank 232, as shown in FIG. 1. Hitch coupling assembly 410 securely couples accessory rack 110 to vehicle 102 using hitch receiver 108 of vehicle 102, as shown in FIG. 3 and FIG. 4. Hitch coupling assembly 410 is easily coupled to and removed from vehicle 102 to allow accessory rack 110 to be easily installed and removed from vehicle 102.

Figure 5:
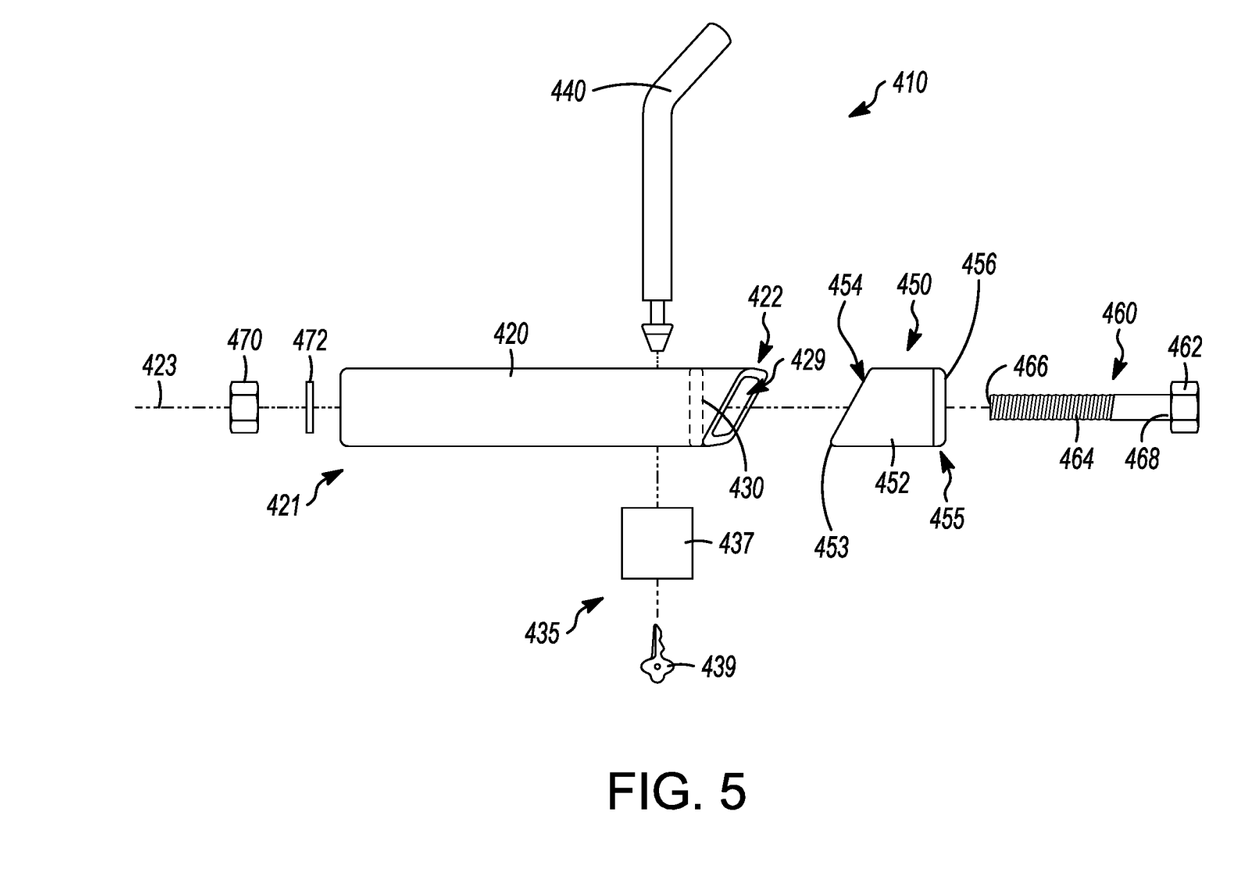
FIG. 5 shows an exploded side view of a hitch coupling assembly.
Figure 6:
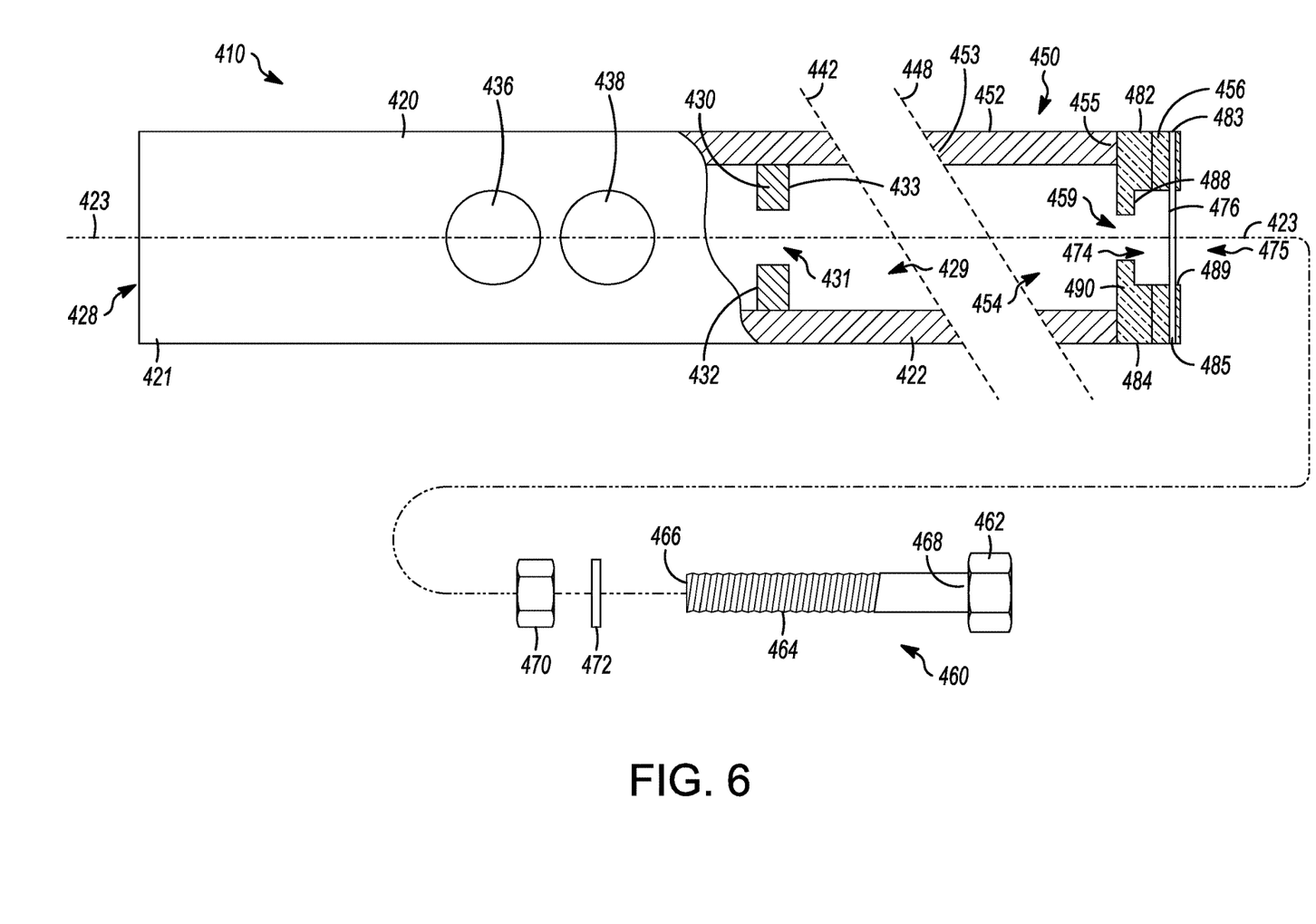
FIG. 6 shows a side partial cutaway view of the hitch coupling assembly of FIG. 5.
Figure 7:
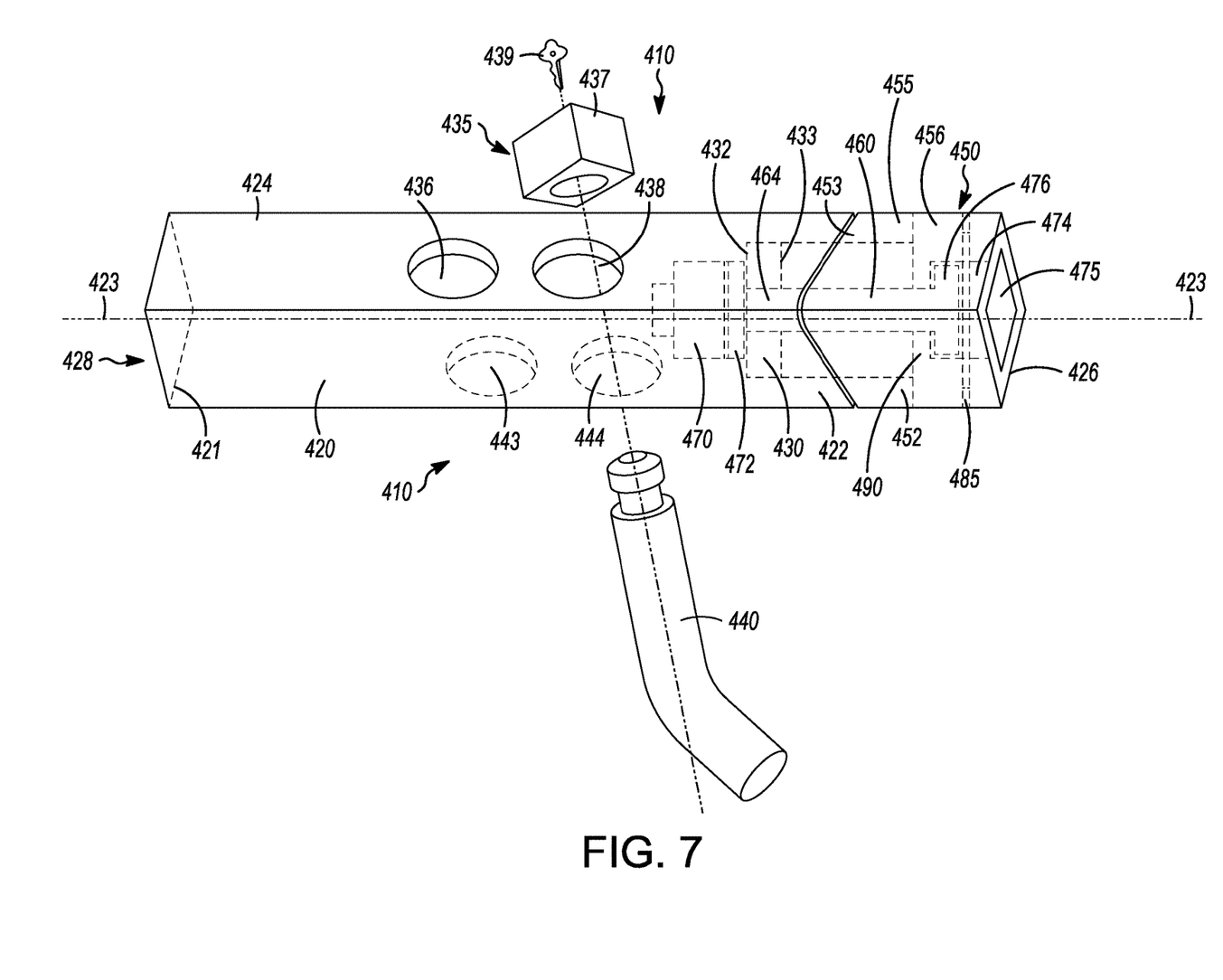
FIG. 7 shows a corner view of the hitch coupling assembly of FIG. 5.
Figure 8:
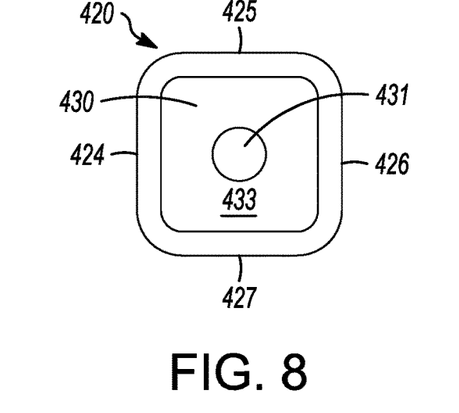
FIG. 8 shows an end view of a receiver tube.
Figure 9:
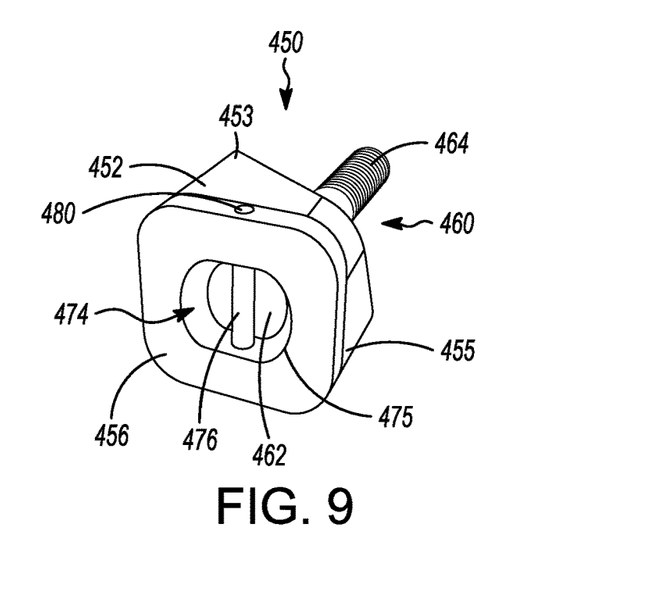
FIG. 9 shows an end perspective view of a receiver wedge element and tightening bolt.
Figure 10:
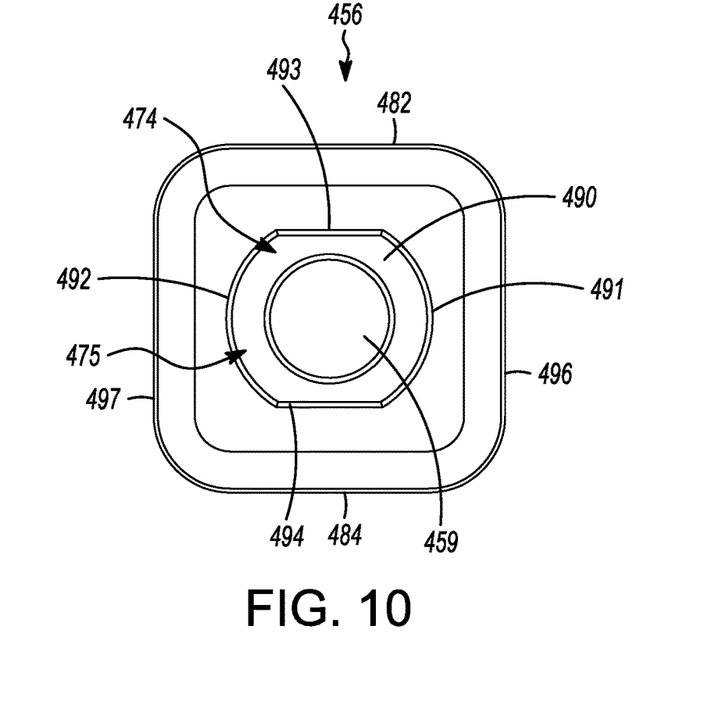
FIG. 10 shows an end view of an end cap.

FIG. 5 through FIG. 10 show details of an embodiment of hitch coupling assembly 410. FIG. 5 shows an exploded view of the elements of hitch coupling assembly 410. FIG. 6 shows a side partial cutaway view of a receiver tube 420, a receiver wedge element 450, and a tightening bolt 460 of hitch coupling assembly 410, showing how the elements fit together to form hitch coupling assembly 410. FIG. 7 shows a corner view of hitch coupling assembly 410 showing how a receiver lock 435 is used to limit access to a nut 470 on a tightening bolt 460 of hitch coupling assembly 410. FIG. 8 shows an end view of receiver tube 420, looking into a second opening 429 of receiver tube 420. FIG. 9 shows an end perspective view of receiver wedge element 450 and tightening bolt 460, showing how a bolt head 462 of tightening bolt 460 is captured in receiver wedge element 450. FIG. 10 shows an end view of a receiver wedge end cap 456 of receiver wedge element 450.

Hitch coupling assembly 410 includes receiver tube 420 and receiver wedge element 450 that is coupled to receiver tube 420 using tightening bolt 460 and nut 470, as shown in FIG. 5 through FIG. 7. In some embodiments, hitch coupling assembly 410 includes a receiver lock 435 that is used to lock receiver tube 420 and receiver wedge element 450 into hitch receiver 108, as shown in FIG. 4, FIG. 5, and FIG. 7.

Receiver tube 420 is an elongate hollow tube of rigid material, metal in this embodiment, with a rounded rectangular shaped transverse cross section, see FIG. 8. Receiver tube 420 has four side panels, first side panel 424, second side panel 426 opposing first side panel 424, third side panel 425 and fourth side panel 427 opposing third side panel 425 (FIG. 8). Each side panel is perpendicular to the two adjacent side panels and parallel to the opposing side panel, see FIG. 8. Receiver tube 420 has the four-sided outer shape to fit easily and snugly into receiver hitch 108 of vehicle 102. Receiver hitches on vehicles usually have a rectangular hollow opening to receive a receiver tube, as shown for hitch receiver 108 in FIG. 2. Receiver tube 420 can be made in other shapes to fit into specific hitch receivers on a vehicle that have cross-sectional opening shapes other than rectangular. Receiver tube 420 is formed of square hollow metal tubing in this embodiment, but this is not meant to be limiting. Receiver tube 420 can be formed of any rigid material.

Receiver tube 420 has a receiver tube first end 421, a receiver tube second end 422 opposing receiver tube first end 421, and a receiver tube longitudinal axis 423. Receiver tube 420 is hollow, with a first end opening 428 at receiver tube first end 421, and a second end opening 429 into receiver tube second end 422.

Receiver tube 420 has a bulkhead 430 inside receiver tube 420, positioned between receiver tube first end 421 and receiver tube second end 422. Bulkhead 430 is a wall coupled to each of the four side panels 424, 425, 426 and 427 of receiver tube 420, and has a bulkhead hole 431 through bulkhead 430, best seen in FIG. 6 and FIG. 8. Bulkhead 430 has a bulkhead first surface 432 that faces receiver tube first end 421 and a bulkhead second surface 433 that faces receiver tube second end 422. Bulkhead first and second surfaces 432 and 433 are each flat surfaces that are perpendicular to receiver tube longitudinal axis 423, in this embodiment.

Receiver tube second end 422 lies in a receiver tube second end plane 442, see FIG. 6. In some embodiments, receiver tube second end plane 442 is perpendicular to receiver tube longitudinal axis 423, but this is not the case for the embodiment shown in the figures. In some embodiments receiver tube end plane 442 is not perpendicular to one or more side panels 424, 425, 426, or 427. In the embodiment of hitch coupling assembly 410 shown in the figures, receiver tube second end plane 442 forms an oblique angle with each of four side panels 424, 425, 426, and 427. In a specific embodiment, receiver tube second end plane 442 is formed by cutting receiver tube second end 422 from one corner to the opposing corner, forming an oblique angle between receiver tube second end plane 442 and each of side panels 424, 425, 426, and 427.

Receiver tube 420 has two sets of lock holes through receiver tube 420, each set having two lock holes. These lock holes are to allow receiver lock 435 to extend through receiver tube 420 and hitch receiver 108, and lock hitch coupling assembly 410 into hitch receiver 108. Receiver tube 420 has two lock holes through first side panel 424, a first lock hole 438 and a third lock hole 436. Receiver tube 420 has two lock holes through second side panel 426 opposing first side panel 424, a second lock hole 444 and a fourth lock hole 443. First lock hole 438 and second lock hole 444 and third and fourth lock hole 436 and 443 are through receiver tube 420 between receiver tube first end 421 and bulkhead 430. First and second lock hole 438 and 444 are lined up with each other so a lock pin 440 can extend through receiver tube 420 as shown in FIG. 7. Third and fourth lock holes 436 and 443 are also lined up with each other and provide another option for extending lock pin 440 through.

Hitch coupling assembly 410 also includes receiver wedge element 450. Receiver wedge element 450 is coupled to receiver tube 420 with tightening bolt 460. Receiver wedge element 450 slides sideways against receiver tube 420 when receiver wedge element 450 is coupled to receiver tube 420, and tightening bolt 460 is tightened. This sliding of receiver wedge element 450 with respect to receiver tube 420 tightens and frictionally couples receiver tube 420 and receiver wedge element 450 inside of hitch receiver tube 108, reducing up and down and side-to-side movement of hitch coupling assembly 410 in hitch receiver 108. This minimizes the movement of accessory rack 110 on vehicle 102.

Receiver wedge element 450 includes a receiver wedge tube 452 and an end cap 456, see FIG. 5 through FIG. 7, FIG. 9 and FIG. 10. Receiver wedge tube 452 is a hollow tube of rigid material, metal in this embodiment, with a rounded rectangular shaped transverse cross section. Receiver wedge tube 452 has a receiver wedge tube first end 453 and a receiver wedge tube second end 455 opposing receiver wedge tube first end 453. Receiver wedge tube first end 453 is open, having a receiver wedge tube first end opening 454 into receiver wedge tube first end 453. Receiver wedge tube second end 455 is covered by end cap 456. End cap 456 is coupled to receiver wedge tube second end 455. End cap 456 is sized and shaped to cover receiver wedge tube second end 455. In some embodiments, end cap 456 and receiver wedge tube 452 are one integral element, see, for example, receiver wedge element 550 shown in FIG. 11 ands FIG. 12 and described herein.

Receiver wedge tube first end 453 lies in a receiver wedge first end plane 448, see FIG. 6. Receiver wedge first end plane 448 is parallel to receiver tube second end plane 442. Receiver wedge first end plane 448 is parallel to receiver tube second end plane 442 so that when receiver wedge element 450 is coupled to receiver tube 420, receiver wedge tube first end 453 mates with and slides against receiver tube second end 422.

End cap 456 is designed to cover receiver wedge tube second end 455 and capture a bolt head 462 of tightening bolt 460 so that bolt head 462 and tightening bolt 460 cannot turn. End cap 456 includes a cavity 474 that is sized and shaped to fit bolt head 462 of tightening bolt 460, see FIG. 6, FIG. 7, FIG. 9 and FIG. 10. Cavity 474 is inset into end cap 456, see FIG. 6, FIG. 7, and FIG. 9. Cavity 474 includes a cavity end wall 490 at a cavity first end 488. Cavity end wall 490 is coupled to and abuts receiver wedge tube second end 455, see FIG. 7. Cavity end wall 490 has an end cap hole 459 through cavity end wall 490 (FIG. 6). End cap hole 459 opens to receiver wedge tube first end 453 when end cap 456 is coupled to receiver wedge tube 452. Cavity 474 has a cavity opening 475 through a cavity second end 489, see FIG. 9 and FIG. 10. Cavity opening 475 opposes end cap hole 459. Cavity opening 475 faces away from receiver wedge tube first end 453. Bolt head 462 of tightening bolt 460 will pass through cavity opening 475, but not end cap hole 459. Cavity 474 and cavity opening 475 have a cross-sectional shape that is designed to conform to a cross-section shape of bolt head 462 so that when bolt head 462 passes through cavity opening 475 and is inset into cavity 474, bolt head 462 is prevented from rotating. In this embodiment, cavity 474 has four sides, best seen in FIG. 10. Cavity 474 has a first cavity side 491 and a second cavity side 492 opposing first cavity side 491. First and second cavity side 491 and 492 are both curved surfaces. Cavity 474 has a third cavity side 493 and a fourth cavity side 494 opposing third cavity side 493. Third cavity side 493 and fourth cavity side 494 are each flat surfaces and are parallel to each other. Third cavity side 493 and fourth cavity side 494 are spaced apart enough for bolt head 462 to slip in between third cavity side 494 and fourth cavity side 494, but not rotate. Once bolt head 462 is positioned inside cavity 474 between third cavity side 493 and fourth cavity side 494, bolt head 462 is prevented from turning by third cavity side 493 and cavity fourth side 494.

End cap 456 has four outer sides, a receiver wedge end cap first side 482, a receiver wedge end cap second side 484 that opposes and is parallel to receiver wedge end cap first side 482; a receiver wedge end cap third side 496, and a receiver wedge end cap fourth side 497 that opposes and is parallel to receiver wedge end cap third side 496, see FIG. 10.

Hitch coupling assembly 410 includes tightening bolt 460 and nut 470. Tightening bolt 460 and nut 470 couple receiver tube 420 and receiver wedge element 450 together before they are coupled to hitch receiver 108. Tightening bolt 460 has a threaded shaft 464 with a threaded shaft first end 466 and bolt head 462 at a threaded shaft second end 468, best seen in FIG. 5 and FIG. 6. Receiver tube 420 and receiver wedge element 450 are formed as two separate pieces so that they can slide against each other inside hitch receiver 108. When receiver wedge tube first end 453 slides along receiver tube second end 422 and they are inside hitch receiver 108, both receiver tube 420 and receiver wedge element 450 press against the inside surfaces of hitch receiver 108, frictionally coupling hitch coupling assembly 410 to hitch receiver 108 and mechanically stabilizing hitch coupling assembly 410 inside hitch receiver 108.

In order to use hitch coupling assembly 410 to couple accessory rack 110 to vehicle 102, accessory rack 110 is coupled to hitch coupling assembly 410. In the embodiment shown in the figures, accessory rack 110 is coupled to hitch coupling assembly 410 by coupling a base rack 120 of accessory rack 110 to receiver tube 420, as shown in FIG. 2 and FIG. 3, but this is not meant to be limiting. It is to be understood that accessory rack 110 can be coupled to hitch coupling assembly 410 in many different ways. In some embodiments, an accessory different from accessory rack 110 is coupled to hitch coupling assembly 410.

Receiver wedge element 450 can be coupled to receiver tube 420 either before or after accessory rack 110 is coupled to receiver tube 420. To couple receiver wedge element 450 to receiver tube 420, tightening bolt 460 is inserted through receiver wedge element 450 by extending threaded shaft first end 466 of threaded shaft 464 through cavity 474 from cavity opening 475 at cavity second end 489, through end cap hole 459 at cavity first end 488, and out receiver wedge tube first end 453, see FIG. 5, FIG. 6, and FIG. 7. Bolt head 462 does not fit through end cap hole 459, and so bolt head 462 is positioned inside cavity 474, abutting cavity wall 490 at cavity first end 488. Threaded shaft first end 466 is inserted into receiver tube 420 through receiver tube second end opening 429, as shown in FIG. 5 and FIG. 6. Threaded shaft first end 466 is extended through bulkhead hole 431. Nut 470, and in this embodiment, a washer 472, is threaded onto threaded shaft first end 466 of threaded shaft 464 by putting nut 470 and washer 472 through receiver tube first end 421. Once nut 470 is threaded onto tightening bolt 460, receiver wedge element 450 is coupled to receiver tube 420 using tightening bolt 460.

In some embodiments of hitch coupling assembly 410, a roll pin 476 is used to capture bolt head 462 in cavity 474, as best seen in FIG. 9. Bolt head 462 is inset into cavity 474. Bolt head 462 is coupled to end cap 456 using roll pin 476. Roll pin 476 is inserted through end cap 456 perpendicular to tightening bolt 460 such that roll pin 476 prevents bolt head 462 and tightening bolt 460 from being removed from cavity 474, as shown in FIG. 9. Roll pin 476 is inserted into a first cap side hole 483 in receiver wedge end cap first side 482, through cavity 474, and through a second cap side hole 485 in receiver wedge end cap second side 484, see FIG. 6, FIG. 9, and FIG. 10. A set screw 480 (FIG. 9) can be inserted into each of first cap side hole 483 and second cap side hole 485 to capture roll pin 476 in end cap 456. Roll pin 476 prevents bolt head 462 from being removed from cavity 474. Since cavity 474 is sized to conform to a cross-section of bolt head 462 and prevent bolt head 462 from rotating, roll pin 476 couples bolt head 462 to end cap 456 and prevents rotation of bolt head 462. With bolt head 462 inset into cavity 474 and prevented from rotating or being removed from cavity 474, hitch coupling assembly 410 is ready to be inserted into hitch receiver 108, as shown in FIG. 2, FIG. 3, and FIG. 4.

Hitch coupling assembly 410 is installed in hitch receiver 108 by inserting receiver wedge element 450 into hitch receiver 108, followed by receiver tube 420, which is loosely coupled to receiver wedge element 420, see FIG. 2 and FIG. 3. Placing receiver tube 420 and receiver wedge element 450 into hitch receiver 108 of vehicle 102 provides the initial coupling of hitch coupling assembly 410 and accessory rack 110 to vehicle 102. Hitch coupling assembly 410 is fixedly coupled to hitch receiver 102 by turning nut 470 on threaded shaft 464 of tightening bolt 460 to compress receiver wedge element 450 against receiver tube 420. A socket wrench is often used to tighten nut 470 on threaded shaft 464 of tightening bolt 460 by extending the socket wrench through receiver tube first end 421. Pressing receiver wedge element 450 against receiver tube 420 by tightening nut 470 causes receiver wedge element 450 and receiver tube 420 to both press against the inside surfaces of hitch receiver 108, which frictionally couples receiver tube 420 and receiver wedge element 450 inside hitch receiver 108. At this point, hitch coupling assembly 410 and accessory rack 110, or whatever accessory is coupled to hitch coupling assembly 410, is coupled to hitch receiver 108 and vehicle 102.

In some embodiments, a receiver lock 435 is used to lock hitch coupling assembly 410 inside hitch receiver 108. Receiver lock 435 is shown in FIG. 4, FIG. 5, and FIG. 7. Receiver lock 435 includes a receiver lock pin 440 that can be mechanically locked into a receiver lock box 437 using a key 439. Receiver lock 435 locks hitch coupling assembly 410 in hitch receiver 108 by extending receiver lock pin 440 through hitch receiver first side hole 107 (see FIG. 2 and FIG. 3), through both first lock hole 438 in first side panel 424 of receiver tube 420 (FIG. 7) and second lock hole 444 in second side panel 426 of receiver tube 420, and through a hitch receiver second side hole (not shown) in hitch receiver 108 that opposes hitch receiver first side hole 107. Receiver lock box 437 is then locked onto one end of receiver lock pin 440 using key 439. Receiver lock box 435 keeps receiver lock pin 440 from being removed from hitch receiver 108 and hitch coupling assembly 410 from one end, and a bend in receiver lock pin 440 keeps receiver lock pin 440 from being removed from the other end.

First lock hole 438 and second lock hole 444 are both positioned through receiver tube 420 between receiver tube first end 421 and bulkhead 430. When receiver lock 435 is installed, nut 470 is prevented from being unthreaded from tightening bolt 460 by receiver lock pin 440 because access to nut 470 is blocked by receiver lock pin 440. Receiver lock 435 and roll pin 476 block access to nut 470 and tightening bolt 460 when hitch coupling assembly is installed, which makes hitch coupling assembly 410 and accessory rack 110 safe from tampering or thieves.

In the embodiment shown in the figures, a hitch receiver third hole 106, and a hitch receiver fourth hole (not shown) that opposes hitch receiver third hole 106, and third and fourth receiver tube holes 436 and 443, provide flexibility of what holes to use with receiver lock 435 for different hitch receivers, accessories, and mechanical configurations.

In some embodiments, hitch coupling assembly 410 includes an accessory trailer hitch receiver 412, as shown in FIG. 2 and FIG. 3. Accessory trailer hitch receiver 412 is coupled to receiver tube 420 in this embodiment, but this is not meant to be limiting. Accessory trailer hitch receiver 412 is used when hitch coupling assembly 410 and accessory rack 110 is installed in hitch receiver 108, and it is also desired that vehicle 102 be equipped to pull a trailer. Accessory trailer hitch receiver 412 can be used to pull a trailer with vehicle 102 when hitch coupling assembly 410 is coupled to vehicle 102 using hitch receiver 108 on vehicle 102.

Figure 11:
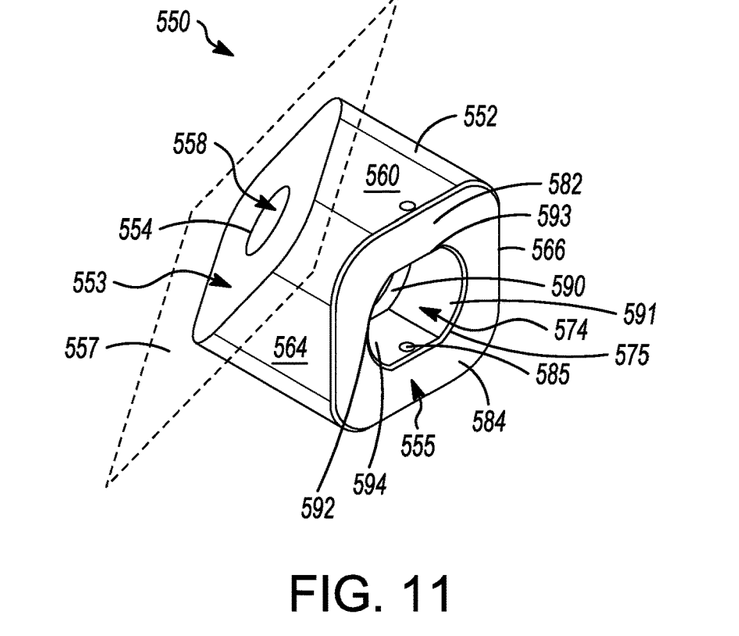
FIG. 11 shows a perspective view of an additional embodiment of a receiver wedge element.
Figure 12:
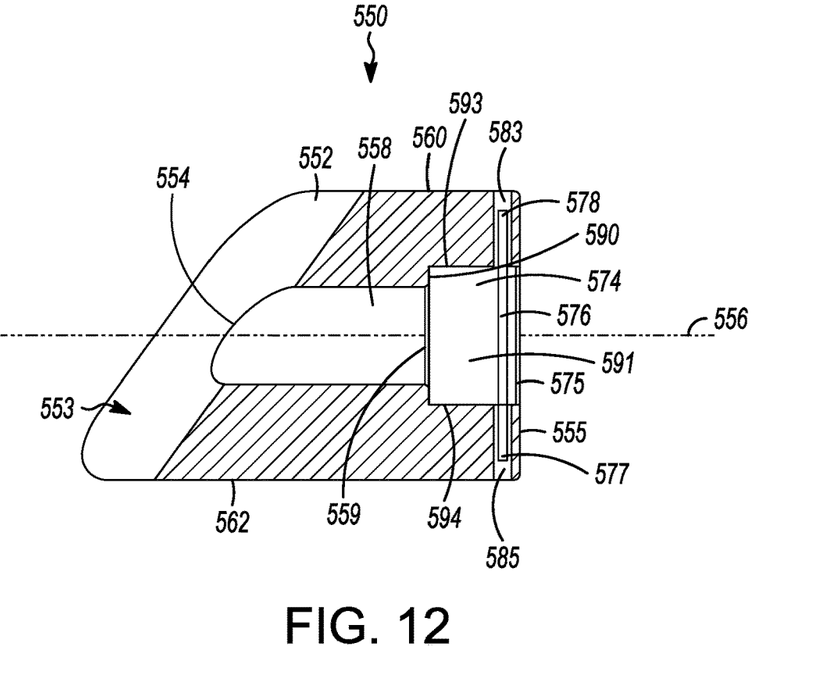
FIG. 12 shows a side view of the receiver wedge element of FIG. 11.

Hitch coupling assembly 410 can have many different embodiments. In a specific alternate embodiment, the receiver wedge tube and the end cap are formed as a single piece, as shown in FIG. 11 and FIG. 12. FIG. 11 and FIG. 12 show an embodiment of a receiver wedge element 550. FIG. 11 shows a perspective view of receiver wedge element 550. FIG. 12 shows a side cutaway view of receiver wedge element 550. Receiver wedge element 550 can be used to replace receiver wedge element 450 in hitch coupling assembly 410 explained above and functions the same as receiver wedge element 450.

Receiver wedge element 550 is coupled to receiver tube 420 with tightening bolt 460 in place of receiver wedge element 450. Receiver wedge element 550 slides sideways against receiver tube 420 when receiver wedge element 550 is coupled to receiver tube 420 and tightening bolt 460 is tightened. This sliding of receiver wedge element 550 with respect to receiver tube 420 tightens and frictionally couples receiver tube 420 and receiver wedge element 550 inside of hitch receiver tube 108, reducing up and down and side-to-side movement of hitch coupling assembly 410 in hitch receiver 108. This minimizes the movement of accessory rack 110 on vehicle 102. Receiver wedge element 550 accepts and captures bolt head 462 of tightening bolt 460 so that tightening bolt 460 cannot rotate.

Receiver wedge element 550 includes a wedge block 552, a cavity 574 in wedge block 552, and a bolt hole 558 through wedge block 552. Wedge block 552 is a hollow block of rigid material, metal in this embodiment, having six outer surfaces. Wedge block 552 has a top outer surface 560 and a bottom outer surface 562 that opposes and is parallel to top outer surface 560. Wedge block 552 has a first side outer surface 564 and a second side outer surface 566 opposing and parallel to first side outer surface 564. Wedge block 552 has a flat first end surface 553 and a flat second end surface 555 that opposes first end surface 555. Wedge block 552 also has a wedge block longitudinal axis 556 extending from first end surface 553 to second end surface 555. Second end surface 555 is perpendicular to each of top and bottom outer surfaces 560 and 562, first and second side outer surfaces 564 and 566, and wedge block longitudinal axis 556.

First end surface 553 lies in a wedge block first end surface plane 557 that is parallel to receiver tube second end plane 442 so that when receiver wedge element 550 is coupled to receiver tube 420, receiver tube second end 421 and wedge block first end surface 553 slide against each other to couple receiver tube 420 and receiver wedge element 550 in hitch receiver 108.

A cavity 574 is inset into second end surface 555. Cavity 574 includes a cavity bottom 590, an open cavity top 575 that opens to second end surface 555, and four cavity side walls. Cavity 574 is designed to capture bolt head 462 of tightening bolt 460 so that bolt head 462 and tightening bolt 460 cannot turn. Cavity 574 is sized and shaped to fit bolt head 462 of tightening bolt 460, see FIG. 11 and FIG. 12. Cavity 574 is inset into second end surface 555 of wedge block 552. Cavity opening 575 faces away from first end surface 553 of wedge block 552. Bolt head 462 of tightening bolt 460 will pass through cavity opening 575, but not bolt hole 558. Cavity 574 has a cross-sectional shape that is designed to conform to a cross-sectional shape of bolt head 462, so that when bolt head 462 passes through cavity opening 575 and is inset into cavity 574, bolt head 462 is prevented from rotating.

Cavity 574 has a first cavity side 591 and a second cavity side 592 opposing first cavity side 591. First and second cavity side 591 and 592 are both curved surfaces. Cavity 574 has a third cavity side 593 and a fourth cavity side 594 opposing third cavity side 593. Third cavity side 593 and fourth cavity side 594 are each flat surfaces and are parallel to each other. Third cavity side 593 and fourth cavity side 594 are spaced apart enough for bolt head 462 to slip in between third cavity side 593 and fourth cavity side 594, but not rotate. Once bolt head 462 is positioned inside cavity 574 between third cavity side 593 and fourth cavity side 594, bolt head 462 is prevented from turning by third cavity side 593 and fourth cavity side 594. Cavity 574 has a cavity opening 559 in cavity bottom 590 for threaded shaft 464 to fit through.

Wedge block 552 has a bolt hole 558 that extends through wedge block 552 along wedge block longitudinal axis 556 from a bolt hole first opening 554 in first end surface 553 to cavity opening 559 in cavity bottom 590. Bolt hole 558 is for threaded shaft 464 to extend through wedge block 552 to couple receiver wedge element 552 to receiver tube 420, as explained above for receiver wedge element 450. Bolt hole 558 is large enough for threaded shaft 464 to fit through, but not for bolt head 462 to fit through. Bolt head 462 fits into cavity 574, but not through bolt hole 558.

Tightening bolt 460 is used to couple receiver wedge assembly 550 to receiver tube 420, just as it is used to couple receiver wedge element 450 to receiver tube 420, as described herein. Threaded shaft 464 first end 466 of threaded shaft 464 is extended through bolt hole 558 from cavity opening 559 to bolt hole first opening 554 in first end surface 553, and into receiver tube first end opening 429 and through bulkhead hole 431 in bulkhead 430. Nut 470 is threaded onto threaded shaft 464 until bolt head 462 abuts cavity bottom 590 and nut 470 is adjacent bulkhead first surface 432. In some embodiments, washer 472 is between nut 470 and bulkhead first surface 432 such that washer 472 abuts bulkhead first surface 432 and nut 470 abuts washer 472. Once nut 470 is threaded onto tightening bolt 460, receiver wedge element 450 is coupled to receiver tube 420.

In some embodiments of hitch coupling assembly, a roll pin 576 is used to capture bolt head 462 in cavity 574, see FIG. 12. Bolt head 462 is inset into cavity 574. Bolt head 462 is coupled to wedge block 552 using roll pin 576. A roll pin first end 577 of roll pin 576 is inserted through a first roll pin hole 583 through top side 582 of wedge block 552, through cavity 574, and through a second roll pin hole 585 in a bottom side 584 of wedge block 552. Roll pin 576 is perpendicular to tightening bolt 460 such that roll pin 576 prevents bolt head 462 and tightening bolt 460 from being removed from cavity 574 and wedge block 552. A set screw can be inserted into each of first roll pin hole 583 and second roll pin hole 585 to capture roll pin 576 in wedge block 552. Roll pin 576 prevents bolt head 462 from being removed from cavity 574. Since cavity 574 is sized to conform to a cross-section of bolt head 462 and prevent bolt head 462 from rotating, roll pin 576 couples bolt head 462 to wedge block 552 and prevents rotation of bolt head 462. With bolt head 462 inset into cavity 574 and prevented from rotating or being removed from cavity 574, hitch coupling assembly 410 using receiver wedge element 550 instead of receiver wedge element 450 is ready to be inserted into hitch receiver 108. The remainder of the installation is the same as explained herein for installing hitch coupling receiver 410 into hitch receiver 108.

Hitch coupling assembly 410 is shown in the figures coupling accessory rack 110 to vehicle 102, but it is to be understood that hitch coupling assembly 410 can be used to couple many different types of accessories to vehicle 102. Any accessory that can be coupled to hitch coupling assembly 410 can use hitch coupling assembly 410 to couple the accessory to hitch receiver 108 and/or vehicle 102.

Figure 13:
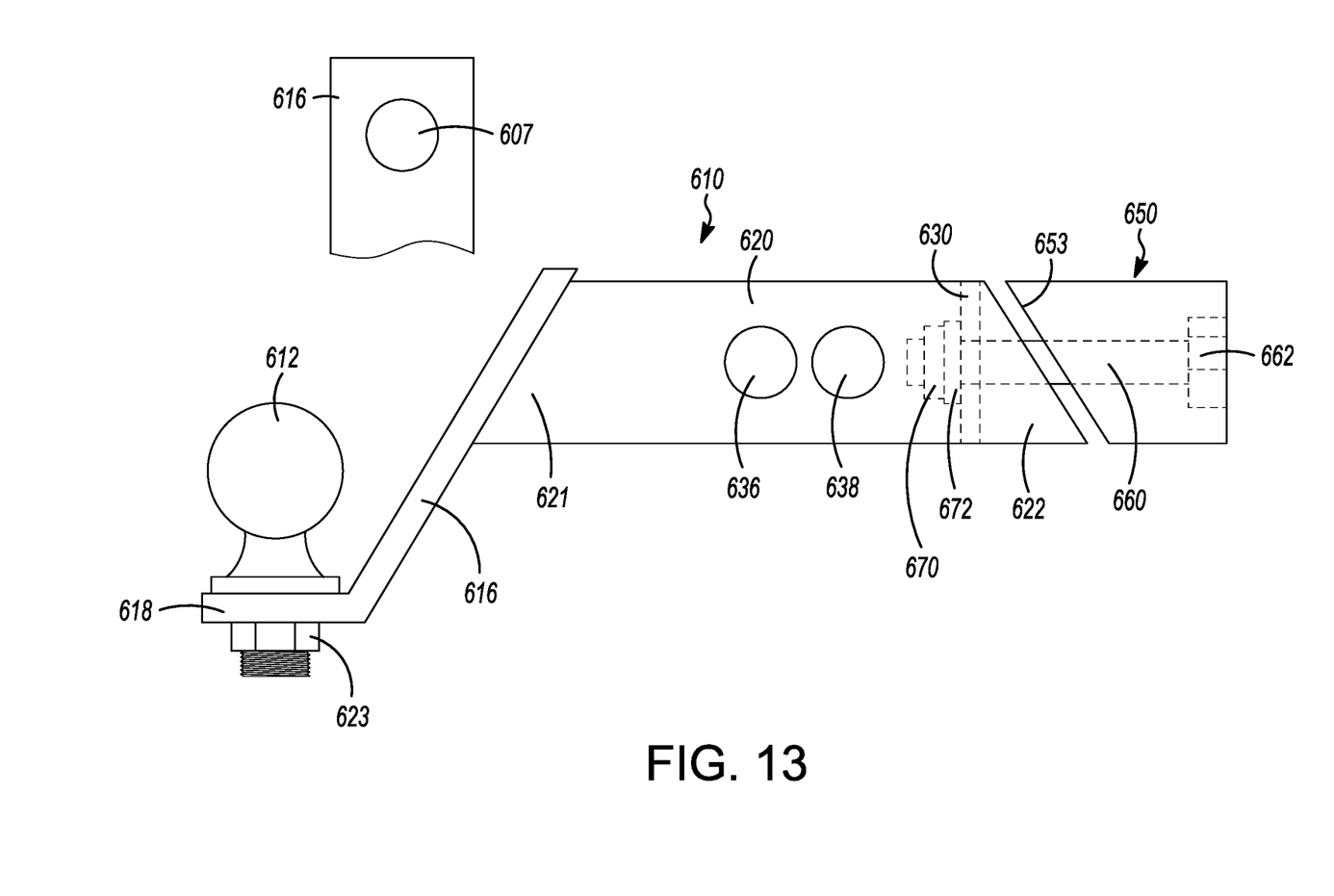
FIG. 13 shows a further embodiment of a hitch coupling assembly that includes a trailer hitch ball.

FIG. 13 shows an embodiment of a hitch coupling assembly 610. Hitch coupling assembly 610 is the same as hitch coupling assembly 410 except a trailer hitch ball 612 is coupled to receiver tube 620 instead of accessory rack 110. Hitch coupling assembly 610 is an assembly for coupling trailer hitch ball 612 to a hitch receiver such as hitch receiver 108 of vehicle 102. Hitch coupling assembly 610 includes a receiver tube 620, a receiver wedge element 650, and a tightening bolt 660 that couples receiver wedge element 650 to receiver tube 620. Receiver tube 620 is similar to receiver tube 420 except that receiver tube 620 has a coupling plate 616 coupled to a receiver tube first end 621 instead of having accessory rack 110 coupled to receiver tube 420.

Receiver tube 620 is an elongate hollow tube with a rounded rectangular shaped transverse cross section. Receiver tube 620 has four side panels, each side panel is perpendicular to the two adjacent side panels and parallel to the opposing side panel. Receiver tube 620 has the four-sided outer shape to fit easily and snugly into receiver hitch 108 of vehicle 102. Receiver tube 620 is formed of square hollow metal tubing in this embodiment, but this is not meant to be limiting. Receiver tube 620 can be formed of any rigid material.

Receiver tube 620 has a receiver tube first end 621 and a receiver tube second end 622 opposing receiver tube first end 621. Receiver tube 620 is hollow, with a first end opening at receiver tube first end 621, and a second end opening into receiver tube 620 at receiver tube second end 622, as described and shown for receiver tube 420.

Receiver tube 620 has a bulkhead 630 inside receiver tube 620, positioned between receiver tube first end 621 and receiver tube second end 622. Bulkhead 630 is a wall coupled to each of the four side panels of receiver tube 620, and has a bulkhead hole through bulkhead 630, as shown and described for receiver tube 420.

Receiver tube second end 622 forms a second end plane that is not perpendicular to the sides of receiver tube 620.

Receiver tube 620 has two sets of lock holes through receiver tube 620, each set having two lock holes. These lock holes are to extend receiver lock 435 through receiver tube 620 and lock hitch coupling assembly 610 into hitch receiver 108, as explained for hitch coupling assembly 410. Receiver tube 620 has two lock holes through a first side panel, a lock hole 638 and a lock hole 636. Receiver tube 620 has two lock holes through a second side panel opposing the first side panel. The lock holes through receiver tube 620 are between receiver tube first end 621 and bulkhead 630 so that when a receiver lock is extended through the lock holes, the receiver lock pin blocks access to a nut 670 and washer 672 that are threaded onto tightening bolt 660.

Hitch coupling assembly 610 includes a receiver wedge assembly 650 that can be the same as receiver wedge element 450 or receiver wedge assembly 550. Receiver wedge assembly 650 has a wedge assembly first end 653 that is parallel to, and couples with, receiver tube second end 622, as explained for receiver wedge element 450. Tightening bolt 660 extends through receiver wedge assembly 650, into receiver tube second end 622, and through bulkhead 630. Nut 670 is threaded onto tightening bolt 660 to couple receiver wedge assembly 650 to receiver tube 420. Receiver wedge assembly 650 is designed to capture a bolt head 662 of tightening bolt 660 and not allow bolt head 662 to rotate once tightening bolt 660 is extended through receiver wedge assembly 650 and bolt head 662 is coupled to receiver wedge assembly 650. Once receiver tube 620 and receiver wedge assembly 650 are inserted into a hitch receiver such as hitch receiver 108, nut 670 is tightened onto tightening bolt 660. Receiver tube 620 and receiver wedge assembly 650 slide against each other as nut 670 is tightening on tightening bolt 660, which presses receiver tube 620 and receiver wedge assembly 650 against the inside surfaces of the hitch receiver, fixedly coupling receiver wedge assembly 650 and receiver tube 620, and therefore hitch coupling assembly 610, inside the hitch receiver.

Trailer hitch ball 612 is coupled to receiver tube 620 using a ball mount plate 618 and coupling plate 616, both of which are flat plates of rigid material. Trailer hitch ball 612 is coupled to ball mount plate 618 using a trailer ball nut 623. Coupling plate 616 is coupled to both ball mount plate 618 and receiver tube 620, coupling ball mount plate 618 and trailer hitch ball 612 to receiver tube 620. Coupling plate 616 has an access hole 607 through coupling plate 616, which provides access through coupling plate 616 to access and tighten nut 670 on tightening bolt 660. Once hitch coupling assembly 610 is coupled to a hitch receiver on a vehicle, trailer hitch ball 612 can be coupled to a trailer and the vehicle can be used to pull the trailer.

Figure 14:
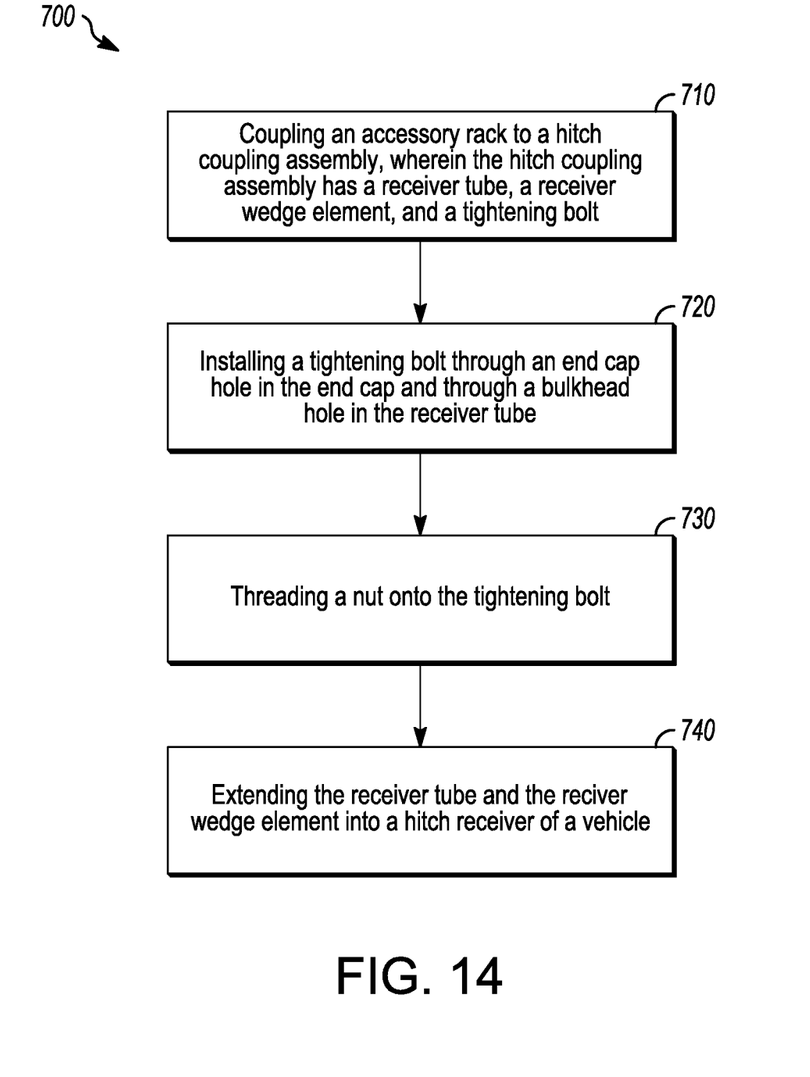
FIG. 14 illustrates a method of coupling an accessory rack to a vehicle.

FIG. 14 illustrates a method 700 of coupling an accessory rack to a vehicle. Method 700 includes an act 710 of coupling the accessory rack to a hitch coupling assembly. The hitch coupling assembly includes a receiver tube, a receiver wedge element, and a tightening bolt that couples the receiver tube to the receiver wedge element. The receiver tube is an elongate hollow tube. The receiver tube has a receiver tube first end having a first end opening into the receiver tube, a receiver tube second end having a second end opening into the receiver tube, and a bulkhead inside the receiver tube. The bulkhead is positioned between the receiver tube first end and the receiver tube second end. The bulkhead has a bulkhead hole through the bulkhead.

In some embodiments, the receiver wedge element includes a receiver wedge tube and an end cap. The receiver wedge tube is a hollow tube with a rectangular transverse cross section, a receiver wedge tube first end having a wedge tube first end opening into the receiver wedge tube, a receiver wedge tube second end, and an end cap coupled to the receiver wedge tube second end. The end cap includes a cavity. The cavity has a cavity end wall at a cavity first end. The cavity end wall is inset into the receiver wedge tube second end. The cavity also has an end cap hole through the cavity end wall, and a cavity opening at a cavity second end. The cavity opening faces away from the receiver wedge tube first end. In some embodiments, the cavity conforms to a shape of a bolt head of the tightening bolt.

In some embodiments, the receiver wedge element includes a wedge block having a cavity inset into the wedge block and a bolt hole extending through the wedge block.

Method 700 includes an act 720 of installing a tightening bolt through the end cap hole and through the bulkhead hole. In some embodiments, act 720 includes extending the tightening bolt through the bolt hole and the bulkhead hole.

Method 700 includes an act 730 of threading a nut onto the tightening bolt, where the tightening bolt and nut couples the receiver wedge element to the receiver tube.

Method 700 also includes an act 740 of extending the receiver tube and the receiver wedge element into a hitch receiver of the vehicle. In some embodiments, method 700 includes turning the nut onto the tightening bolt until the receiver tube and the receiver wedge element are frictionally held inside the hitch receiver. In some embodiments, method 700 includes coupling a bolt head of the tightening bolt to the end cap to prevent rotation of the bolt head. In some embodiments, method 700 includes insetting the bolt head of the tightening bolt into the cavity, where rotation of the bolt head is prevented in response to the bolt head being inset into the cavity.

Method 700 can include many other acts. In some embodiments, method 700 includes extending a roll pin through the end cap perpendicular to the tightening bolt, wherein the roll pin prevents the tightening bolt from being removed from the cavity.

In some embodiments, method 700 includes extending a receiver lock pin of a receiver lock through a hitch receiver first side hole, a receiver tube first lock hole, a receiver tube second lock hole, and a hitch receiver second side hole.

Embodiments of a hitch coupling assembly have been shown and described. The hitch coupling assembly is used to couple an accessory to a vehicle by coupling the accessory to a hitch receiver of the vehicle. The hitch coupling assembly is shown coupling an accessory rack and a trailer hitch ball to a hitch receiver. The hitch coupling assemblies can be used to couple many different accessories, parts, and pieces to a hitch receiver. The hitch coupling assembly includes a receiver tube and a receiver wedge assembly. The receiver tube and the receiver wedge assembly are coupled to each other using a tightening bolt. The receiver tube, receiver wedge assembly, and tightening bolt are then inserted into a hitch receiver and the tightening bolt is tightened to couple the hitch coupling assembly to the hitch receiver. A receiver lock can be used to lock the hitch coupling assembly into the hitch receiver. An accessory rack or other accessory that is coupled to the hitch coupling assembly is coupled to the hitch receiver and the vehicle by coupling the hitch coupling assembly to the hitch receiver.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. An assembly for coupling an accessory to a hitch receiver of a vehicle, the assembly comprising:
 a receiver tube, wherein the receiver tube is an elongate hollow tube with a rounded rectangular shaped transverse cross-section, and wherein the receiver tube comprises:
  a receiver tube first end having a first end opening into the receiver tube;
  a receiver tube second end having a second end opening into the receiver tube; and
  a bulkhead inside the receiver tube positioned between the receiver tube first end and the receiver tube second end, having a bulkhead hole through the bulkhead, a bulkhead first surface and a bulkhead second surface;
 a receiver wedge element, wherein the receiver wedge element comprises:
  a receiver wedge tube, wherein the receiver wedge tube is a hollow tube with a rounded rectangular shaped transverse cross section;

a receiver wedge tube first end having a wedge tube first end opening into the receiver wedge tube;
a receiver wedge tube second end; and
an end cap coupled to the receiver wedge tube second end, wherein the end cap comprises a cavity, and wherein the cavity comprises:
a cavity end wall at a cavity first end;
an end cap hole through the cavity end wall; and
a cavity opening at a cavity second end, wherein the cavity opening faces away from the receiver wedge tube first end;
a tightening bolt that couples the receiver wedge element to the receiver tube, wherein the tightening bolt has a threaded shaft and a bolt head coupled to an end of the threaded shaft;
and
a nut that threads onto the threaded shaft;
wherein the threaded shaft extends through the end cap hole from the cavity second end to the cavity first end, into the second end opening and through the bulkhead hole;
wherein the bolt head abuts the cavity end wall; and
wherein the nut threads onto the threaded shaft and is adjacent the bulkhead first surface.

2. The assembly of claim 1, wherein the bolt head is coupled to the end cap.

3. The assembly of claim 1, wherein the bolt head is inset into the cavity.

4. The assembly of claim 3, wherein the cavity conforms to a shape of the bolt head and prevents the bolt head from rotating.

5. The assembly of claim 4, further comprising a roll pin extending through a first cap side hole in a receiver wedge end cap first side, through the cavity, and into a second cap side hole in a receiver wedge end cap second side, wherein the roll pin prevents the bolt head from being removed from the cavity.

6. The assembly of claim 1, further comprising an accessory trailer hitch receiver coupled to the receiver tube.

7. The assembly of claim 1, wherein the receiver tube further comprises:
four side panels, wherein each side panel is perpendicular to two adjacent side panels and parallel to an opposing side panel;
a first lock hole through a first side panel of the four side panels;
a second lock hole through a second side panel of the four side panel, wherein the second side panel opposes the first side panel; and
wherein the assembly further comprises:
a receiver lock comprising a receiver lock pin, wherein the receiver lock pin extends through the first lock hole and the second lock hole.

8. The assembly of claim 7, wherein the first lock hole and the second lock hole are both between the receiver tube first end and the bulkhead, and wherein the nut is prevented from being unthreaded from the tightening bolt in response to the receiver lock pin extending through the first and the second lock holes.

9. The assembly of claim 7, wherein a receiver tube second end plane forms an oblique angle with each of the four side panels.

10. The assembly of claim 9, wherein a receiver wedge first end plane is parallel to the receiver tube second end plane.

11. A method of coupling an accessory to a vehicle, the method comprising:

coupling the accessory to a hitch coupling assembly, wherein the hitch coupling assembly comprises:
a receiver tube, wherein the receiver tube is an elongate hollow tube with a rectangular transverse cross-section, and wherein the receiver tube comprises:
a receiver tube first end having a first end opening into the receiver tube;
a receiver tube second end having a second end opening into the receiver tube;
and
a bulkhead inside the receiver tube positioned between the receiver tube first end and the receiver tube second end, having a bulkhead hole through the bulkhead; and
a receiver wedge element, wherein the receiver wedge element comprises:
a receiver wedge tube, wherein the receiver wedge tube is a hollow tube with a rectangular transverse cross section;
a receiver wedge tube first end having a wedge tube first end opening into the receiver wedge tube;
a receiver wedge tube second end; and
an end cap coupled to the receiver wedge tube second end, wherein the end cap comprises a cavity, and wherein the cavity comprises:
a cavity end wall at a cavity first end, wherein the cavity end wall is inset into the receiver wedge tube second end;
an end cap hole through the cavity end wall; and
a cavity opening at a cavity second end, wherein the cavity opening faces away from the receiver wedge tube first end;
installing a tightening bolt through the end cap hole and through the bulkhead hole;
threading a nut onto the tightening bolt, wherein the tightening bolt and nut couples the receiver wedge element to the receiver tube; and
extending the receiver tube and the receiver wedge element into a hitch receiver of the vehicle.

12. The method of claim 11, further comprising extending a roll pin through the end cap perpendicular to the tightening bolt, wherein the roll pin prevents the tightening bolt from being removed from the cavity.

13. The method of claim 11, further comprising turning the nut onto the tightening bolt until the receiver tube and the receiver wedge element are frictionally held inside the hitch receiver.

14. The method of claim 11, further comprising extending a receiver lock pin of a receiver lock through a hitch receiver first side hole, a receiver tube first lock hole, a receiver tube second lock hole, and a hitch receiver second side hole.

15. The method of claim 11, further comprising coupling a bolt head of the tightening bolt to the end cap to prevent rotation of the bolt head.

16. The method of claim 11, further comprising insetting a bolt head of the tightening bolt into the cavity, wherein rotation of the bolt head is prevented in response to the bolt head being inset into the cavity.

17. An assembly for coupling an accessory to a hitch receiver of a vehicle, the assembly comprising:
a receiver tube, wherein the receiver tube is an elongate hollow tube with a rounded rectangular shaped transverse cross-section, and wherein the receiver tube comprises:
a receiver tube first end having a first end opening into the receiver tube;

a receiver tube second end having a second end opening into the receiver tube; and
a bulkhead inside the receiver tube positioned between the receiver tube first end and the receiver tube second end, having a bulkhead hole through the bulkhead, a bulkhead first surface and a bulkhead second surface;
a receiver wedge element comprising:
a wedge block comprising:
a top outer surface and a bottom outer surface, wherein the top and the bottom outer surface are parallel to each other;
a first side outer surface and a second side outer surface, wherein the first and the second side outer surfaces are parallel to each other;
a flat first end surface;
a flat second end surface opposing the first end surface;
and
a wedge block longitudinal axis extending from the first end surface to the second end surface;
a cavity inset into the second end surface, wherein the cavity comprises:
four cavity side walls;
a cavity bottom;
a cavity opening in the cavity bottom; and
an open cavity top that opens to the second end surface;
a bolt hole extending through the wedge block along the wedge block longitudinal axis from a bolt hole first opening through the first end surface to the cavity opening in the cavity bottom;
a tightening bolt that couples the receiver wedge element to the receiver tube, wherein the tightening bolt comprises:
a threaded shaft that is sized to slide through the bolt hole; and
a bolt head coupled to an end of the threaded shaft, wherein the bolt head fits into the cavity but not through the bolt hole;
and
a nut that threads onto the threaded shaft;
wherein the threaded shaft extends through the bolt hole from the cavity opening to the bolt hole first opening, into the receiver tube second end opening and through the bulkhead hole;
wherein the bolt head abuts the cavity bottom; and
wherein the nut threads onto the threaded shaft and is adjacent the bulkhead first surface.

18. The assembly of claim 17, wherein the bolt head is inset into the cavity.

19. The assembly of claim 18, wherein the cavity conforms to a shape of the bolt head and prevents the bolt head from rotating.

20. The assembly of claim 19, further comprising a roll pin extending through a first roll pin hole through a top side of the wedge block, through the cavity, and through a second roll pin hole in a bottom side of the wedge block, wherein the roll pin prevents the bolt head from being removed from the cavity.

* * * * *